June 7, 1949.  W. O. FOLGER  2,472,069

TRACTOR TRAILER ELECTRICAL COUPLING

Filed Nov. 1, 1946

INVENTOR.
Wayne O. Folger.
BY

Patented June 7, 1949

2,472,069

UNITED STATES PATENT OFFICE 2,472,069

TRACTOR TRAILER ELECTRICAL COUPLING

Wayne O. Folger, Wichita, Kans.

Application November 1, 1946, Serial No. 707,248

2 Claims. (Cl. 173—328)

This invention relates to an electrical connector and it is primarily an object of the invention to provide a connector of this kind wherein the desired coupling or uncoupling of the parts may be effected by relative turning movement of such parts and wherein the structure is such as to eliminate the use of screws, bolts or kindred elements.

While the connector as herein comprised is one which is adapted for universal use, it relates particularly to its use as a coupler between the cables of adjacent vehicles and wherein the structure of the connector is such as to substantially eliminate tendency of the plug member of the connector, from working up and down within the socket member of the connector, thus maintaining a solid connection resulting in the elimination of the light blinking or being disconnected as a result of vibration incident to travel.

It is also an object of the invention to provide a connector of this kind constructed in a manner whereby the collection of dirt and grease is substantially eliminated, and wherein the structure is such as to dispense with any parts liable to be broken off.

It is also an object of the invention to provide a connector of this kind wherein the parts thereof are particularly adapted for use in connection with cables and wherein each of said parts is provided with means for connecting or anchoring the same direct to the cable in order to relieve the connection against strain.

The invention consists in the details of construction and in the combination and arrangement of the several parts of my improved electrical connector whereby certain advantages are attained, as will be hereinafter more fully set forth.

Figure 1:
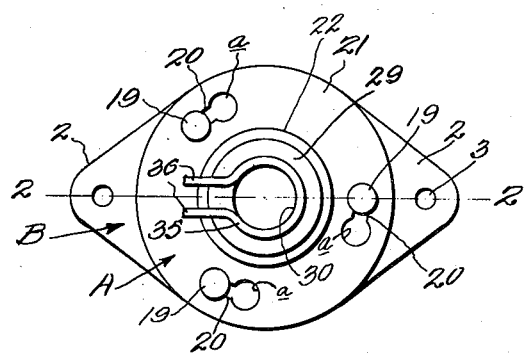
Figure 2:
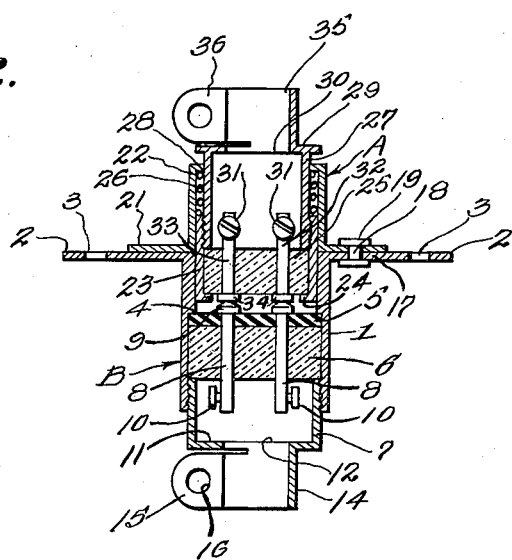

In order that my invention may be better understood, I will now proceed to describe the same with reference to the accompanying drawings, wherein:

Figure 1 is a view in top plan of a connector constructed in accordance with an embodiment of the invention; and Figure 2 is a vertical, sectional view taken substantially on the line 2—2 of Figure 1.

In the embodiment of the invention as illustrated in the accompanying drawings, the connector comprises two parts A and B, the part A constituting a plug and the part B constituting a socket.

The member B comprises a cylindrical shell 1 of desired dimensions and which is provided at its outer end with the oppositely disposed extensions 2 substantially at right angles to the axis of the shell 1 and which are provided with the openings 3. These extensions or wings 2 provide means whereby the shell B may be effectively secured in desired position. The inner portion of the bore of the shell 1 is of increased diameter to provide an inwardly facing internal shoulder 4 against which abuts a plate or disk 5 of insulating material of high density to withstand impact or shock.

In direct contact with the inner face of the plate or disk 5 is an insulating block 6 of porcelain or other suitable insulating material and which, together with the plate or disk 5, is maintained in effective tight position within the shell 1 by the cylindrical sleeve 7 threading into the inner end of the shell 1 and butting the outer face of the block 6, as is clearly shown in Figure 2.

It is to be noted that the disk or plate 5 is a material distance inwardly of the outer or entrance end of the bore of the shell 1 and that there is disposed through both the plate or disk 5 and the block 6, the spaced, elongated conductor members 8 extending beyond the inner end of the block 6 and having their opposite ends provided with the contact heads 9 in advance of and in close contact with the outer face of the disk or plate 5.

The portions of the conductor members 8 extending beyond the inner face of the plug 6 constitute posts and said posts carry the laterally directed terminal screws 10, whereby the terminals of the electric conductors within a cable may be properly connected with the conductors 8.

The outer end of the sleeve 7 has disposed thereover a head 11 provided in its central portion with an opening 12, through which an end portion of a cable is inserted. The opening 12 is defined by an outstanding slit collar 14 which substantially entirely surrounds the inserted end portion of the cable. Each end of the collar 14 is provided with an outstanding ear 15 to provide means whereby a suitable clamping bolt may be employed for tightly securing the collar 14 to the cable, whereby the member B is effectively held in working position and in a manner whereby all strain of the cable will be imposed directly upon the member B and not in any way upon the connection afforded by the terminal screws 10. Each of the ears 15 are provided with an opening 16 for the passage of the clamping bolt (not shown).

The wings or extension 2 are carried directly by a surrounding flange 17 at the entrance end of the shell 1 and said flange 17 at equidistantly spaced points therearound is provided with a series of outstanding headed stubs 18 herein disclosed as three in number, and equidistantly spaced around the axial center of the shell 1.

The outer head 19 of these studs 18 freely passes through the enlarged end portion $a$ of a buttonhole slot 20, provided in a surrounding flange 21 carried by the outer end of a shell 22 comprised in the member A. This shell 22 is cylindrical and of desired dimensions and it is believed to be readily apparent that by relative turning movement of the members A and B the same may be readily applied or disconnected, as required, without needing the use of tools of any kind and in a manner whereby the structure of the connector in its entirety is such as to eliminate the use of connecting screws or bolts.

Snugly and slidably disposed within the outer or entrance end of the shell 22 of the member A is a tubular sleeve 23 having its outer extremity provided with an inwardly disposed surrounding lip 24 which provides a stop for the plug 25 of porcelain or other desired insulating material.

The sleeve 23 is yieldingly maintained projected a desired distance beyond the shell 22 through the medium of a spring 26 of desired tension surrounding a second sleeve 27 and interposed between the inner end of the sleeve 23 and an inwardly disposed lip 28 at the outer end of the sleeve 27. The sleeve 27 threads within the sleeve 23 and its inserted end has direct contact with the plug 25 whereby said plug 25 is rigidly and securely held in applied position. The outer end of the sleeve 27 is provided with a head 29 having a central opening 30 to allow the insertion within the sleeve 27 of an end portion of a second cable so that the terminals of the conductors within said cable may be electrically connected through the medium of the terminal screws 31 with the posts 32 afforded by the extended extremities of the conductor members 33 disposed through the plug or block 26. These conductor members 33 outwardly of the block or plug 25 are provided with the contact heads 34 which are adapted to have direct contact with the heads 9 of the conductors 8 carried by the member B.

The opening 30 of the sleeve 27 is defined by an outstanding split collar 35 adapted to surround the adjacent portion of a cable passing through the opening 30, and to be clamped thereto, by the valve bolt passing through the outstanding ears 36 at the ends of the split collar 35.

As the sleeves 7 and 27 are readily removable it is believed to be apparent that the desired electrical connections can be had with the members 8 and 33 prior to the final assembly of the members A and B.

In view of the foregoing it is believed to be obvious that each of the members A and B is of a structure which is substantially free against ingress of dirt or grease and therefore is of a character to require but a minimum amount of attention.

It is believed to be obvious from the foregoing that when the members A and B are coupled, tendency of the member A to work up and down is substantially eliminated and thus avoiding blinking of the lights or kindred interference with the electric circuit. It is also believed to be self-evident that the construction of the parts A and B are such that when coupled they are free from disconnection as a result of vibration incident to travel.

While the connector herein disclosed is particularly adapted for use in connection with a coupling of electric cables between vehicles, yet it is to be understood that it can be employed with equal facility for other purposes and is therefore adapted for universal use.

From the foregoing description it is thought to be obvious that an electrical connector constructed in accordance with my invention is particularly well adapted for use by reason of the convenience and facility with which it may be assembled and operated.

I claim:

1. An electrical connector comprising two members, one of said members constituting a plug and the other a socket, the plug member including a shell, a sleeve telescopically engaging within said shell, means for constantly urging the sleeve outwardly beyond an end of the shell, an insulating medium within the shell, contact members carried by said medium, a second sleeve freely insertable within the shell through the end thereof remote from the first sleeve, and providing means for holding the insulating medium within the first sleeve, and contact members within the socket member with which the contact members of the plug member engage when the two members are in assembly.

2. An electrical connector comprising a plug member and a socket member, said plug member comprising a shell having an out-turned flat surrounding flange at one end and an in-turned flange at its other end, a sleeve inserted at one end into the end of the shell having the out-turned flange, said sleeve having an in-turned flange upon its outer end, a second sleeve inserted into the end of the shell having the in-turned flange and extending into and having threaded connection with the inner end of the first sleeve, an expansion spring encircling the second sleeve and interposed between the in-turned flange of the shell and the inner end of the first sleeve, the second sleeve being open at its outer end for the extension of a current conductor thereinto, an insulation body positioned within the first sleeve and resting upon the in-turned flange of the first sleeve, the insulation body being contacted by the inner end of the second sleeve, current conductors carried by and extending through the insulation body, the said flanged end of the first sleeve being adapted for extension into the socket, said socket having an encircling outwardly directed flange upon the end into which the plug extends, the out-turned flanges of the plug and socket being adapted for contacting superimposed relation, means for detachably coupling the contacting flanges of the plug and socket together, an insulation body secured within the socket, current conducting terminals carried by and extending through the last named insulation body and adapted for electrical contact with the first mentioned terminals, and the said socket at the end opposite from the out-turned flange thereof being open for the extension thereinto of a current conductor.

WAYNE O. FOLGER.

REFERENCES CITED

The following references are of record in the file of this patent:

UNITED STATES PATENTS

| Number | Name | Date |
| --- | --- | --- |
| Re. 18,193 | Kollath | Sept. 15, 1931 |
| 1,687,074 | Wichert | Oct. 9, 1928 |
| 1,953,593 | Douglas | Apr. 3, 1934 |
| 1,978,116 | Roper | Oct. 3, 1934 |
| 2,110,131 | Anklam | Mar. 8, 1938 |
| 2,194,769 | Reed | Mar. 26, 1940 |
| 2,302,276 | Violet | Nov. 17, 1942 |